United States Patent [19]

Block

[11] Patent Number: 5,337,939
[45] Date of Patent: Aug. 16, 1994

[54] METHOD FOR SOLDERING A CERAMIC BODY OF AN ELECTRICAL COMPONENT INTO A METAL HOUSING

[75] Inventor: Christian Block, Graz, Austria

[73] Assignee: Siemens Matsushita Components GmbH & Co KG, Munich, Fed. Rep. of Germany

[21] Appl. No.: 115,933

[22] Filed: Sep. 1, 1993

[30] Foreign Application Priority Data

Sep. 1, 1992 [DE] Fed. Rep. of Germany ....... 4229163

[51] Int. Cl.⁵ .................... B23K 1/00; B23K 101/36
[52] U.S. Cl. .................... 228/124.1; 228/124.6; 228/193
[58] Field of Search ............... 228/122.1, 124.1, 124.6, 228/193, 195

[56] References Cited

U.S. PATENT DOCUMENTS

| | | | |
|---|---|---|---|
| 4,168,519 | 9/1979 | Hertz | 361/304 |
| 4,726,507 | 2/1988 | Landram | 228/124.6 |
| 5,103,135 | 4/1992 | Lange et al. | 313/623 |

*Primary Examiner*—Samuel M. Heinrich

[57] ABSTRACT

A method for soldering a ceramic body of an electric component, such as a microwave resonator, into a metal housing, includes applying a tin layer over the ceramic body provided with an electrically conductive layer. A high-melting-point lead-tin passivation layer is applied to a surface of the housing to be soldered to the ceramic body.

6 Claims, 1 Drawing Sheet

METHOD FOR SOLDERING A CERAMIC BODY OF AN ELECTRICAL COMPONENT INTO A METAL HOUSING

BACKGROUND OF THE INVENTION

Field of the Invention

The present invention relates to a method for soldering a ceramic body of an electrical component into a metal housing.

In electric components with ceramic component bodies, an electrically conductive layer, which can generally be referred to as a contact lining, is applied to the ceramic body. That is the case, for instance, with temperature-dependent resistors or in microwave filters, which have a ceramic component body. That kind of contact lining may, for instance, be a copper layer or a nickel-copper layer. In the latter case, the copper is located on the outside.

Since the copper oxidizes, provisions must be made for passivating it, in order to avoid oxidation. A lead-tin layer, which preferably has a high melting point and at the same time is suitable for soldering the ceramic component body into a housing, is suitable for such passivation. A lead-tin layer of that kind applied to the surface of the ceramic body is composed of 95% lead and 5% tin, for example. That kind of lead-tin layer with a high melting point is also especially suitable because it keeps the component fixed when the customer performs low-melting-point soldering of the component to install it in a circuit.

If, as described above, the lead-tin layer is applied to the surface of the ceramic body of the component, that is done by galvanizing techniques. In other words, the ceramic body is placed in a lead-tin bath. However, that kind of process is disadvantageous for environmental reasons, and in view of wastewater treatment is substantially more cost-intensive, especially because of the heavy metal, that is lead.

SUMMARY OF THE INVENTION

It is accordingly an object of the invention to provide a method for soldering a ceramic body of an electrical component into a metal housing, which overcomes the hereinaforementioned disadvantages of the heretofore-known methods of this general type and which can be used to solder the component ceramic body into a housing without having to apply a high-melting-point lead-tin layer to the ceramic body by galvanizing techniques.

With the foregoing and other objects in view there is provided, in accordance with the invention, a method for soldering a ceramic body of an electric component, such as a microwave resonator, into a metal housing, which comprises applying a tin layer over a ceramic body of an electric component provided with an electrically conductive layer, and applying a high-melting-point lead-tin passivation layer to a surface of a housing to be soldered to the ceramic body.

In accordance with another mode of the invention, there is provided a method which comprises applying the tin layer to the ceramic body in a thickness of from 1 to 2 μm.

In accordance with a further mode of the invention, there is provided a method which comprises applying the high-melting-point lead-tin layer to the housing by a plating process, in a thickness of approximately 20 μm.

In accordance with an added mode of the invention, there is provided a method which comprises applying the electrically conductive layer to the ceramic body in the form of a copper layer.

In accordance with a concomitant mode of the invention, there is provided a method which comprises applying the electrically conductive layer to the ceramic body in the form of a nickel-copper layer.

Other features which are considered as characteristic for the invention are set forth in the appended claims.

Although the invention is illustrated and described herein as embodied in a method for soldering a ceramic body of an electrical component into a metal housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
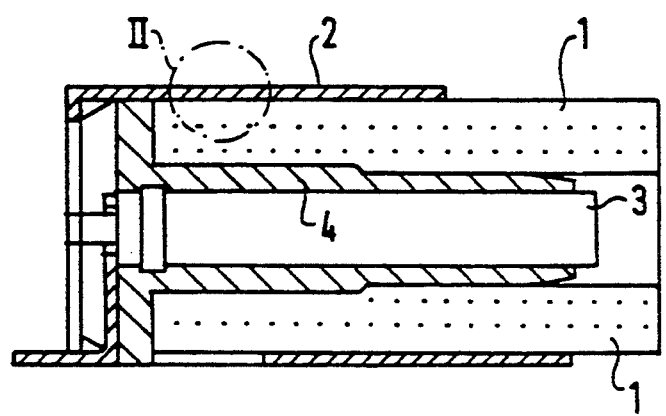
FIG. 1 is a diagrammatic, sectional view of a ceramic microwave filter produced according to the invention.

Referring now to the figures of the drawing in detail and first, particularly, to FIG. 1 thereof, there is seen a microwave filter which includes two ceramic resonators 1, that are soldered into a housing 2 which is preferably made from copper. A plastic pin holder 3 is introduced coaxially on the sides of the ceramic resonators 1 that are remote or face away from the housing 2. A brass pin 4 serving to provide electrical coupling is coaxially disposed in the pin holder 3.

Figure 2:
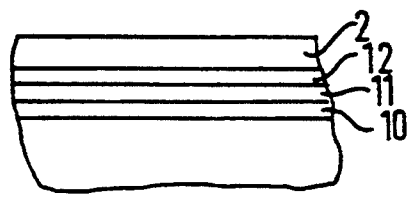
FIG. 2 is a fragmentary view of a portion outlined by a circle II in FIG. 1.

The method for soldering the ceramic resonators 1 into the housing 2 according to the invention will be described in further detail below, with reference to the diagrammatic detail shown in FIG. 2.

The ceramic resonators or bodies 1 are provided with an electrically conductive layer 10, which is preferably a copper layer. However, it may also be a multiple layer with a nickel layer applied first to the ceramic body and a copper layer then applied over it. This alternative is not separately shown in FIG. 2.

According to the invention, a tin layer 11 serving the purpose of passivation is then applied over this electrically conductive layer 10. According to further feature of the invention, this latter layer 11 is very thin, with a thickness of approximately 1 to 2 μm. This tin layer 11 may be applied by a plating process.

A lead-tin layer 12 is applied on the inside of the housing 2 that is oriented or faces toward the ceramic resonators 1. Since this lead-tin layer 12 need only be thick enough to ensure that a tin-lead/tin alloy is created in a soldering process between it and the tin layer 11 on the ceramic resonator 1, and the alloy has such a high proportion of lead that the melting temperature of this new alloy is still high, the lead-tin layer 12 does not need to be applied by galvanic techniques in a lead-tin bath. Instead, it can be applied to the housing surface by cold rolling, for instance. Therefore, the method of the invention does not entail the environmental burden associated with a lead-tin bath.

The soldering process can be performed directly, without additional soldering material, in a protective gas, forming the tin-lead/tin alloy, between the tin layer 11 on the ceramic resonator 1 and the lead-tin layer 12 on the housing 2. This represents a further advantage over a conventional method using a lead-tin layer on the ceramic bodies, because the conventional method requires the use of an additional solder with a high melting point.

I claim:

1. A method for soldering a ceramic body of an electric component into a metal housing, which comprises:
    applying a tin layer over a ceramic body of an electric component provided with an electrically conductive layer, and
    applying a high-melting-point lead-tin passivation layer to a surface of a housing to be soldered to the ceramic body.

2. The method according to claim 1, which comprises applying tin layer to the ceramic body in a thickness of from 1 to 2 μm.

3. The method according to claim 2, which comprises applying the high-melting-point lead-tin layer to the housing by a plating process, in a thickness of approximately 20 μm.

4. The method according to claim 1, which comprises applying the electrically conductive layer to the ceramic body in the form of a copper layer.

5. The method according to claim 1, which comprises applying the electrically conductive layer to the ceramic body in the form of a nickel-copper layer.

6. A method for soldering a microwave resonator into a metal housing, which comprises:
    applying a tin layer over a microwave resonator provided with an electrically conductive layer, and
    applying a high-melting-point lead-tin passivation layer to a surface of a housing to be soldered to the microwave resonator.

* * * * *